W. R. DUNKEL.
TRANSMISSION GEAR.
APPLICATION FILED SEPT. 14, 1908.

921,522.

Patented May 11, 1909.

Witnesses

Inventor
Wilber R. Dunkel.
By C. A. Snow & Co.
Attorneys

UNITED STATES PATENT OFFICE.

WILBER R. DUNKEL, OF PANA, ILLINOIS.

TRANSMISSION-GEAR.

No. 921,522.

Specification of Letters Patent.

Patented May 11, 1909.

Application filed September 14, 1908. Serial No. 453,003.

*To all whom it may concern:*

Be it known that I, WILBER R. DUNKEL, a citizen of the United States, residing at Pana, in the county of Christian and State of Illinois, have invented a new and useful Transmission-Gear, of which the following is a specification.

My invention relates to transmission gears, and its object is to provide an improved form of such gear wherein it will be possible to key to a shaft any one of a series of gears while the shaft is rotating, in a positive manner and without danger of having two or more gears connected to the shaft at the same time.

Figure 1:
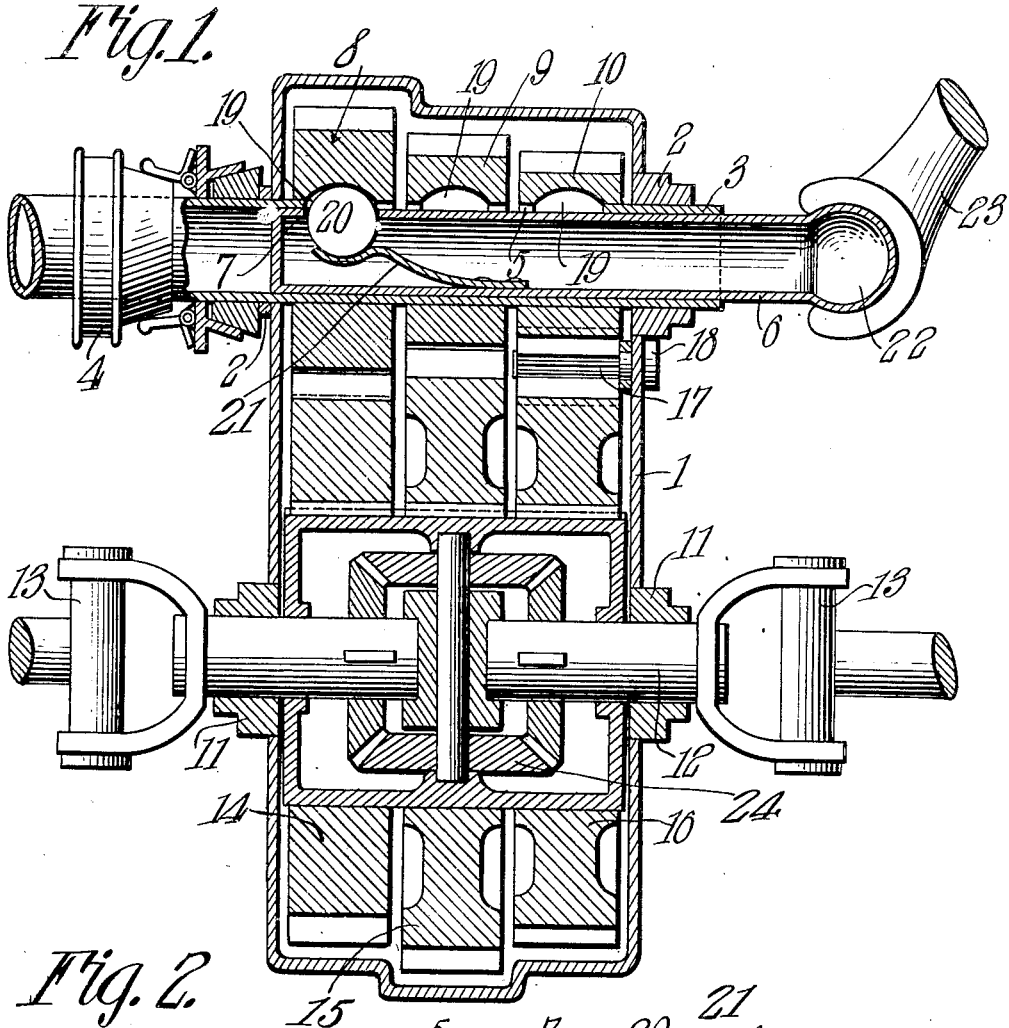
Figure 2:
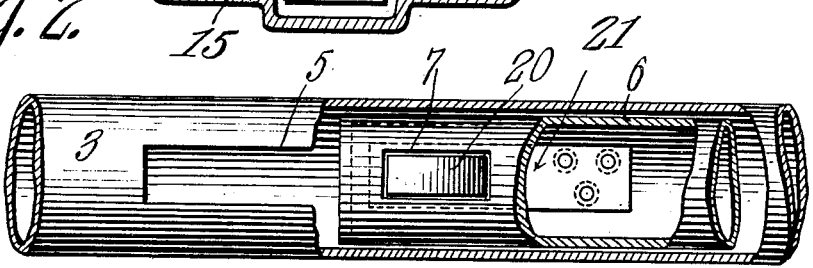

In the drawings:—Figure 1 is a section through the transmission box of a motor car showing the application of my device. Fig. 2 is a partial cut away view of my shaft.

Similar numerals of reference are employed to indicate corresponding parts throughout the several figures of the drawings.

My invention consists broadly of a series of gears mounted on a hollow shaft, said hollow shaft being provided with means contained therein to key any one of said gears to the shaft. In the form of my device that I have here shown, the casing 1 is provided to hold the gears. Through boxes 2 on said casing extends a hollow shaft 3. At 4 is a clutch which may be of any desired form. The shaft 3 is provided with a slot 5 extending approximately for nearly the length of that part of the shaft contained within the casing 1. A hollow plunger 6 having a slot 7 is held to move in said hollow shaft in such manner that the slots are in alinement. On the shaft 3 are mounted gears 8, 9 and 10, in this instance the gear 8 being the high speed gear, the gear 9 being the low speed gear, and the gear 10 the backing or reverse gear. In boxes 11 in the same casing is mounted a shaft 12 forming the main driving shaft and provided with suitable couplings or universal joints, as at 13. Upon the shaft 12 are keyed gears 14, 15 and 16, and as is shown, the gear 14 meshes with gear 8 and the gear 15 meshes with gear 9. Between gears 10 and 16, however, is interposed an idler 17 carried by a suitable pin or bolt 18. This idler is in mesh with both gears 10 and 16 and reverses the action in the usual manner. In the gears 8, 9 and 10 are formed key ways 19, which I preferably make so that their longitudinal section will be the segment of a circle, the height of the arc being relatively one-third or thereabout of the radius. I may, however, make these key ways of any other desired form.

Within the hollow shaft, and projecting through the slot 17 is a key 20 in the form of a disk or roller. This key is normally pressed outward by the action of a spring 21 held in said plunger, and is of such size that in no instance will the outer edge come within the hollow portion of the shaft, but will continuously remain projecting into or through the slot 5, thus insuring the alinement of the two slots hereinbefore mentioned.

At 22 is provided a ball and socket joint or other means to permit the free rotation of the plunger 6, and connected to this joint is a suitable lever 23 to cause the plunger 6 to move longitudinally in said hollow shaft.

From an inspection of my drawing it will be seen that as there shown, the gear 8 is keyed to the shaft 3 and upon rotation of the latter, will move therewith and actuate the shaft 12 through the gear 14. Now, if it be desired to cause one of the other gears to actuate the shaft 14 through its mate, it is simply necessary to move the plunger 6 outwardly. The form of key way in gear 8 will then force the key 20 down into the hollow of the plunger, thus freeing all of the gears and giving them free rotation on the shaft. As the plunger is drawn still further along, the key 20 comes opposite the key way in the next gear, and although this key way may not be at that moment in alinement with the slot in the shaft, just as soon as the shaft revolves far enough to bring said key way into alinement with said slot, the key will be forced outwardly and lock the gear to the shaft, thus causing rotation of shaft 12 through the new gear. It is obvious that the plunger may be moved in either direction from this point and cause any gear to key with the shaft.

I have here shown both shaft and plunger as having the hollow portion therein circular in cross section, but it is obvious that any other cross section might be used, as for instance, it might be desirable to merely slot a portion of the plunger sufficient to receive the spring and key. I do not, therefore, desire to confine myself to the exact form herein shown, but wish to include all such as properly come within the scope of my invention. It will be noted that there is also illustrated in the drawing a differential gear 24 of the ordinary type, the same being introduced between the sections or members of the drive shaft, and having its drum encircled by the gears 14, 15 and 16.

I claim:—

1. In a transmission gear, a hollow shaft having a slot therein, a series of gears rotatably mounted on said shaft opposite said slot, and each having a key-way formed therein, a plunger slidably mounted in said shaft, a disk loosely carried by said plunger, and resilient means adapted to project said disk through said slot and into engagement with the key-way in one of said gears.

2. In a transmission gear, a hollow shaft provided with a slot, a series of gears rotatably mounted upon said shaft opposite said slot and each having a key-way formed therein, which is concaved longitudinally, a plunger slidably mounted in the shaft, and provided with a slot in alinement with the slot in the shaft, a disk carried by the plunger, and a resilient means carried by the plunger adapted to project the disk through the slots in the plunger and the shaft, and into engagement with one of the key-ways of the gears.

In testimony that I claim the foregoing as my own, I have hereto affixed my signature in the presence of two witnesses.

WILBER R. DUNKEL.

Witnesses:
W. W. MORRISON,
JOHN W. ATKISON.